H. ACKERMANN.
STEP-BY-STEP ROLLING MILL.
APPLICATION FILED FEB. 13, 1912.

1,038,710.

Patented Sept. 17, 1912.

2 SHEETS—SHEET 1.

Witnesses:

Inventor
Hugo Ackermann.

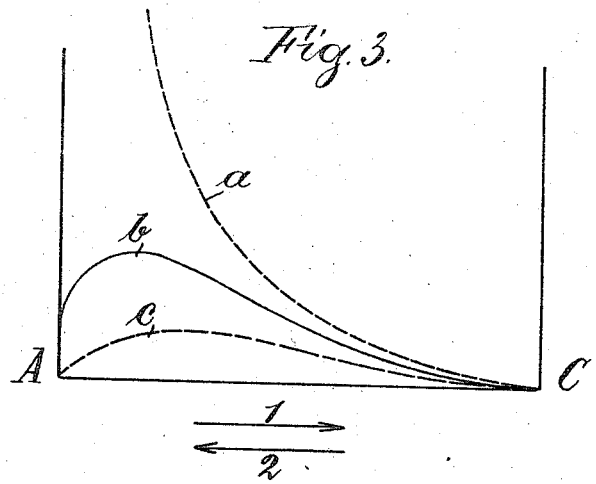
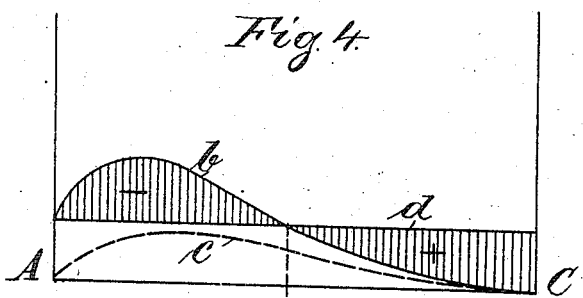
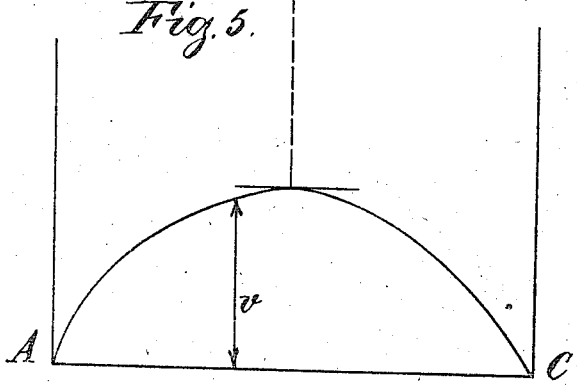

UNITED STATES PATENT OFFICE.

HUGO ACKERMANN, OF DINSLAKEN, GERMANY.

STEP-BY-STEP ROLLING-MILL.

1,038,710.

Specification of Letters Patent.  Patented Sept. 17, 1912.

Application filed February 13, 1912. Serial No. 677,322.

*To all whom it may concern:*

Be it known that I, HUGO ACKERMANN, a subject of the King of Prussia, and resident of Dinslaken-on-the-Niederrhein, in the German Empire, have invented certain new and useful Improvements in Step-by-Step Rolling-Mills, of which the following is a specification.

This invention relates to step-by-step rolling mills and particularly to an improvement in or modification of the braking devices described in the specification of my prior United States patent application Serial No. 527,135, filed November 10th, 1909, wherein the braking force is generated in one or more braking cylinders, during the forward step or return stroke of the blank, by the compression of a fluid, such as air, drawn into the braking cylinders during the backward step or working stroke, the braking force being destroyed shortly before the blank reaches the end of its forward step by exhausting the compressed fluid in the braking cylinders through a suitably controlled exhaust valve.

The object of the present invention is to provide a more simple construction of braking device in which the destruction of the braking force takes place automatically on the completion of the braking action.

According to the present invention the braking cylinder is provided with an exhaust opening of suitable size which connects the cylinder constantly with the fluid space from which the compressible fluid is drawn, for example, with the atmosphere, said exhaust opening being of such dimensions and preferably so adjustable as to enable the necessary pressure for the braking action to be generated in the cylinder.

Figure 1:
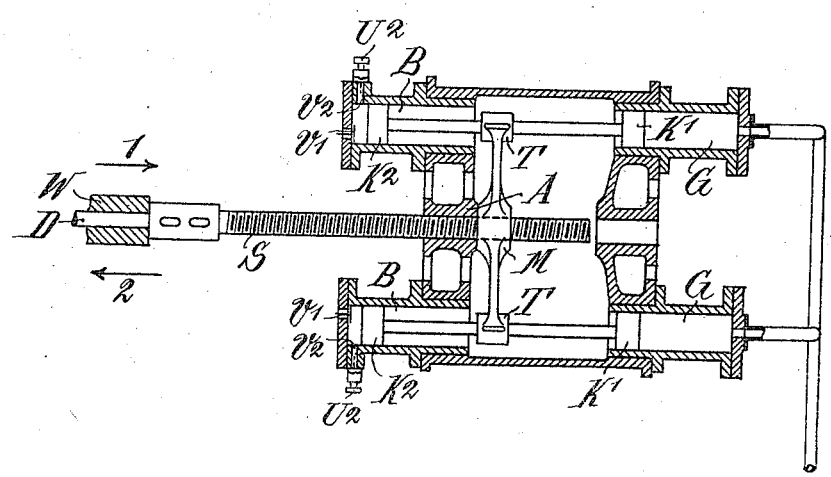
Figure 2:
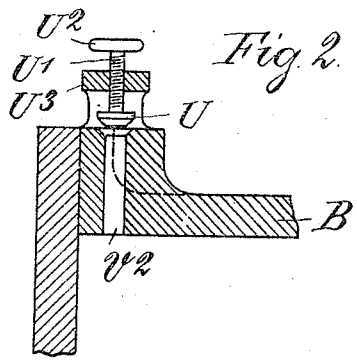

In order that the invention may be more readily understood, reference is made to the accompanying drawings, whereon:

Figure 1 illustrates by way of example a braking mechanism for step-by-step rolling mills constructed according to my present invention, Fig. 2 is a detail sectional view of the exhaust opening in the braking cylinders. Fig. 3 is a diagram illustrating in full lines at $b$ a curve of a hypothetical braking force, while the dotted line $a$ indicates the adiabatic curve, and the dotted line $c$ a hypothetically insufficient braking force. Fig. 4 is a diagram illustrating a hypothetical force acting on the blank during the forward step or return stroke of the latter. Fig. 5 is the velocity curve derived by combining the curve $b$ of Fig. 1 with the force diagram illustrated in Fig. 4.

The arrow 1 indicates the direction of the backward step or working stroke of the blank while the arrow 2 represents the direction of the forward step or return movement of the blank.

Referring to Figs. 1 and 2 of the drawings the blank W shown in fragmentary section is carried by a mandrel D which is coupled to a screwed spindle S slidably guided in a bearing A on the frame work of the rolling mill. The screwed spindle S is threaded in the manner described in my aforesaid prior patent specification in an internal screw-threaded nut M which is carried by a cross-head T fixed to the rods joining the two rods of pistons K' and K² which work within cylinders G and B respectively. The cylinders G are in constant connection with a compressed fluid chamber in the manner described in my aforesaid prior patent specification, while the cylinders B are each provided with a suction valve V' and an exhaust opening V² which is constantly open to the cylinder B and to the atmosphere. The exhaust opening V² is illustrated in detail in Fig. 2 and is preferably provided with a conical valve U carried by a screwed spindle U' passing through a screwed aperture in a bridge U³ which is mounted on the cylinder casing, said spindle U' being capable of rotation by means of a thumb nut U², so that the valve U may be readily adjusted to regulate the cross-sectional area of the outlet end of the exhaust opening V².

It will of course be understood that the valve U hereinbefore described serves only as an example and may be dispensed with if desired, in which case, the size of the exhaust opening V² must be so dimensioned that the requisite throttling effect is obtained. The valve U however enables the size of the exhaust opening V² to be regulated according to the different conditions under which the rolling mill works; such as for example when tubes of different diameters are to be rolled, in which case the mass or weight which requires to be accelerated and again retarded in velocity is variable within considerable limits. It will of course be understood that if desired the valve U may be replaced by any other suitable regulating mechanism for varying the cross sectional area of the exhaust opening $V^2$.

Referring to Figs. 3 to 5 of the drawings in which the rolling mill is to be assumed in a position to the left of said figures and in which the arrow 1 designates the backward step and the arrow 2 the forward step of the blank, as in Fig. 1. The point A indicates the end of the forward step and C the point at which the forward step commences, so that the distances A—C represents the distance traversed by the blank and the parts connected therewith during the working stroke of the rolling mill as well as during the period of time, in which the momentum of the movable system is destroyed by the counteracting force in the cylinder G after the rollers have released the blank while the line A—C also represents the suction line during the backward step, the fluid being drawn into the cylinders B through the valve V′ or in any other desired manner.

At the point C the suction valve V′ is closed and the forward step and consequent compression of the fluid drawn into the cylinders B then takes place. If the braking cylinders B were fully closed, the compression curve would take the line of the adiabatic $a$ indicated in Fig. 3 but owing to the provision of the exhaust opening $V^2$, fluid compressed in the cylinder B constantly escapes therefrom, so that a pressure curve is obtained whose height will vary according to the area of the exhaust opening $V^2$. It is therefore necessary to vary the cross sectional area of the exhaust opening $V^2$ according to the desired braking effect and this may be most readily effected by firstly providing a comparatively large exhaust opening $V^2$, whereby a braking curve will be obtained, such as that indicated at $c$ in Fig. 3. By comparing the curve $c$ with the diagram $d$ of Fig. 4 which represents the returning force acting in the cylinders G during the forward step of the blank, it can be determined whether a braking effect will take place, and as seen in Fig. 4 by taking the hypothetical curve $c$ it will be found that no braking effect would take place on the blank reaching the end of its forward stroke at A. While the rollers and the returning force in the cylinders G maintain the step by step movement of the blank W, the cross sectional area of the exhaust opening $V^2$ is diminished whereupon the braking effect is increased until the pressure curve more and more approximates to the adiabatic curve $a$. As soon as the braking effect exceeds the returning force, a braking action will take place and the velocity of the movable parts will be correspondingly diminished during the forward step. The braking effect is then so regulated by controlling the area of the exhaust opening $V^2$ until the point A, that is the end of the forward step, is just attained at a decreasing velocity, whereupon the velocity curve during the forward stroke will correspond to the hypothetical curve $v$ illustrated in Fig. 5 for the corresponding braking curve $b$ illustrated in Figs. 3 and 4.

The peculiar pressure curve $v$ is derived from the counter-action of the compression in the cylinders B and the velocity of the moving system. At the commencement of the forward step the compression is comparatively small and therefore comparatively little fluid will escape through the exhaust opening $V^2$ in spite of the fact that the velocity $v$ of the moving system V is small and the exhausting period therefor correspondingly large. The pressure curve therefore almost approximates the true compression curve $a$ at this point. On the further forward movement of the blank the pressure increases but at the same time the velocity of the moving system also increases and the exhausting period is therefore decreased, so that the exhaust of the fluid remains comparatively small in spite of the increased pressure. These conditions only vary toward the end of the forward step as the braking pressure has in the mean time become considerable and the velocity of the moving system decreased so that the quantity of fluid exhausted will be constantly increased until more fluid escapes than corresponds to the further movement of the pistons $K^2$ of the braking cylinders B when the pressure in the braking cylinders will rapidly decrease.

By correspondingly adjusting the size of the outlet opening $V^2$, the braking force may be so regulated as to be equal to or smaller than the returning force in the cylinders G at the end of the forward step, so that the blank does not rebound before the rollers have again come into engagement therewith. The exhaust opening $V^2$ after having been regulated in the manner hereinbefore described can remain unaltered while any variation of the returning force or of the weight of the movable mass may be allowed for by corresponding adjustment of the exhaust opening $V^2$.

I claim:—

1. In a step-by-step rolling mill for rolling a blank, a reciprocatory mandrel for carrying the blank, means for effecting the forward movement of said mandrel, a brake cylinder having an exhaust opening therein in constant communication with the interior of said cylinder and with a fluid space, and a piston working in said cylinder, said piston being adapted to draw fluid into said cylinder during the backward movement of said mandrel and to force out said fluid under compression through said opening on the forward movement of said mandrel, so as to diminish the pressure in said cylinder near the end of said forward movement.

2. In a step-by-step rolling mill for rolling a blank, a reciprocatory mandrel for carrying the blank, means for effecting the forward movement of said mandrel, a brake cylinder having an exhaust opening therein in constant communication with the interior of said cylinder and with a fluid space, means for regulating the cross-sectional area of said opening, and a piston working in said cylinder, said piston being adapted to draw fluid into said cylinder during the backward movement of said mandrel and to force out said fluid under compression through said opening on the forward movement of said mandrel so as to diminish the pressure in said cylinder near the end of said forward movement.

3. In a step-by-step rolling mill for rolling a blank, a reciprocatory mandrel for carrying the blank, means for effecting the forward movement of said mandrel, a brake cylinder having an exhaust opening therein in constant communication with the interior of said cylinder and with a fluid space, a valve adapted to more or less close said opening, an adjustable spindle carrying said valve and a piston working in said cylinder, said piston being adapted to draw fluid into said cylinder during the backward movement of said mandrel and to force out said fluid under compression through said opening on the forward movement of said mandrel, so as to diminish the pressure in said cylinder near the end of said forward movement.

In witness whereof I have hereunto set my hand in the presence of two witnesses.

HUGO ACKERMANN.

Witnesses:
  WOLDEMAR HAUPT,
  HENRY HASPER.